US006263681B1

(12) United States Patent
Laut

(10) Patent No.: US 6,263,681 B1
(45) Date of Patent: Jul. 24, 2001

(54) APPARATUS AND METHOD FOR COOLING ARTICLES

(75) Inventor: Reinhard Laut, Hille (DE)

(73) Assignee: Sollich KG, Bad Salzuflen (DE)

( * ) Notice: Subject to any disclaimer, the term of this patent is extended or adjusted under 35 U.S.C. 154(b) by 0 days.

(21) Appl. No.: 09/548,126

(22) Filed: Apr. 12, 2000

(30) Foreign Application Priority Data

Apr. 20, 1999 (DE) .............................. 199 17 778

(51) Int. Cl.[7] ................................. F25D 13/06
(52) U.S. Cl. .................. 62/63; 62/374; 62/380
(58) Field of Search .................. 62/63, 373, 374, 62/380

(56) References Cited

U.S. PATENT DOCUMENTS

| 4,142,376 | | 3/1979 | Sandberg | 62/158 |
| 4,276,753 | * | 7/1981 | Sandberg et al. | 62/374 |
| 4,757,691 | * | 7/1988 | Compagnon | 62/224 |
| 5,605,049 | * | 2/1997 | Moore et al. | 62/63 |
| 5,630,321 | * | 5/1997 | Miller | 62/380 |

FOREIGN PATENT DOCUMENTS

| 196 07 055 C2 | 3/1998 | (DE) . |
| 197 24 639 A1 | 11/1998 | (DE) . |

OTHER PUBLICATIONS

"Universal–Kuhlkanale Fur Kuverture, Kakaoglasuren Und Gegenstromkuhlung" by Von Peter Sawitzki; German Magazine Susswaren (1/2–88) pp. 43–47.

* cited by examiner

Primary Examiner—Ronald Capossela
(74) Attorney, Agent, or Firm—Thomas, Kayden, Horstemeyer & Risley, LLP

(57) ABSTRACT

An apparatus for cooling articles (4), especially articles being covered with a chocolate mass, includes a cooling channel (1) and a conveyer belt (2) for transporting the articles (4) through the cooling channel (1). The articles (4) in the cooling channel (1) are exposed to a temperature profile (31) extending approximately from the entrance (5) to the exit (6) of the cooling channel (1). A first cooling circuit through which a first cooling medium (14, 24) flows is connected to a first cooling stretch (12). The first cooling medium (14, 24) enters the first cooling stretch (12) in the middle region (11) of the cooling channel (1) at a first entering temperature (17, 30). A first temperature sensor (18, 25) is arranged in the region of the entrance (5) of the cooling channel (6) for sensing the temperature of the first cooling medium (14, 24). A first control device (37, 51) controls the temperature of the first cooling medium (14, 24) in the sense of keeping the temperature substantially constant in the region of the entrance (5) of the cooling channel (1) and in the sense of changing the first entering temperature (17, 30) of the first cooling medium (14, 24) in response to the load of articles (4) being located in the cooling channel (1). Correspondingly, there is a second cooling circuit and a second cooling stretch (13). A second temperature sensor (23, 27) is arranged in the region of the exit (6) of the cooling channel (1) for sensing the temperature of the second cooling medium (24, 26). A second control device (46, 58) correspondingly controls the temperature of the second cooling medium (24, 26).

20 Claims, 3 Drawing Sheets

APPARATUS AND METHOD FOR COOLING ARTICLES

CROSS REFERENCE TO RELATED APPLICATIONS

This application claims the benefit of co-pending German Patent Application No. 199 17 778.3 entitled "Verfahren und Vorrichtung zum Kühlen von Warenstücken, insbesondere von mit Schokolademasse überzogenen Süßwaren", filed on Apr. 20, 1999.

FIELD OF THE INVENTION

The present invention generally relates to an apparatus for cooling articles. More particularly, the present invention relates to an apparatus for cooling articles being covered with a chocolate mass. The present invention also relates to a method of cooling articles, especially articles being covered with a chocolate mass.

BACKGROUND OF THE INVENTION

Apparatuses for cooling articles are commonly known in the art. A cooling channel for articles being covered with a chocolate mass and the like is known from German Patent No. 196 07 055 C2. The articles are located on a conveyor belt, and they are transported thereon through the cooling channel. The cooling channel includes two cooling stretches in which three cooling zones are formed. Air is used as cooling medium. The air being cooled by an evaporating apparatus is introduced approximately in the middle region of the cooling channel at an entering temperature for each cooling stretch. Both cooling stretches are separated by a bottom plate. The cooling medium of the first cooling stretch streams in an inverse direction, first above the bottom plate (radiation cooling), and then below the bottom plate (convection cooling) in the direction toward the entrance of the cooling channel. Its direction is changed there such that it is guided back in the same direction as the articles toward the middle region of the cooling channel. Convection cooling at a parallel flow prevails in the second cooling stretch approximately thermally treating the middle region to the exit of the cooling channel. Thus, the articles are carefully cooled in the middle region of the cooling channel. The articles are intensively cooled in the second cooling stretch. Consequently, there is a temperature profile along the length of the cooling channel. The temperature profile consists of locally different temperatures of the cooling medium by which heat is withdrawn from the articles. The curve illustrating the decreasing temperature of the articles attainable with the temperature profile substantially corresponds to the curve illustrating the solidification of the chocolate mass on the articles.

During a constant load of the cooling channel, meaning when a constant number of articles per unit of time passes the cooling channel, there is a temperature profile extending along the length of the cooling channel that corresponds to the solidifying condition. The cooling channel fulfils its cooling function. This means that the cooling medium enters each cooling stretch in the middle region of the cooling channel at a correspondingly low entering temperature, it absorbs heat from the articles, and it leaves the cooling stretch of the cooling channel at a correspondingly increased exiting temperature. Consequently, the entering temperature of the cooling medium in the middle region of the cooling channel has to be kept at a lower value than the exiting temperature to attain a constant cooling effect for the articles. In case of changing loads of the cooling channel, there is the necessity of changing and adapting, respectively, the cooling effect. This is especially the case when the production is stopped, and the production is newly started afterwards.

A method of cooling covered food, especially sweets and bakery products, is known from German Patent Application No. 197 24 639 A1. The articles are conveyed through the cooling channel on a conveyor belt. There are two cooling circuits and two cooling stretches, the cooling medium approximately entering the cooling channel in the middle region of the cooling channel. A liquid cooling medium is used for the bottom cooling (contact cooling). The upper cooling of the articles (convection cooling) is realized by air as cooling medium. This is effected in the first cooling stretch in an inverse flow, and in the second cooling stretch with a flow in the direction of the movement of the articles. The method is possibly based on a certain entering temperature (flow temperature) of the cooling medium, the temperature either being determined in response to the prevailing conditions, or being constant. The streaming velocity of the cooling medium is being controlled. The streaming velocity is changed in a way such that there is a temperature difference between the exiting temperature and the entering temperature of the cooling medium with which the product is produced with the desired quality. The lower the streaming velocity of the cooling medium is, the greater is the temperature difference. The velocity of the cooling medium is changed by a frequency control allowing for a limited range of control. The control of the velocity of the cooling medium corresponds to the control of the amount of the cooling medium. In this way, it is possible to realize an adaptation to changing conditions. On the other hand, the streaming conditions in the corresponding cooling stretch are changed when the velocity of the cooling medium is changed. This means that the articles are differently treated along the width of the cooling channel at different loads. The articles are differently thermally treated. When the temperature difference during the production of the product at the desired quality has been determined, the value of the temperature difference is entered as the desired value for the production in a way that it is determined for the further cooling process of the product. All this may happen during a full load of the cooling channel. When the production is stopped the entering temperature of the cooling medium is controlled in a way that the actual value of the exiting temperature of the cooling medium is determined and the desired value is changed corresponding to the actual value of the temperature difference. The entering temperature of the cooling medium is raised up to a value below the exiting temperature at a small temperature difference. In this way, the correct exiting temperature of the cooling medium is to be attained when the products enter the cooling channel. In case of a longer stop of the production, meaning that no articles enter the cooling channel, there is the danger of the desired temperature difference between the exiting temperature and the entering temperature of the cooling medium not being kept constant. Since no articles enter the cooling channel, and no articles transfer heat, the exiting temperature of the cooling medium will decrease to the value of the entering temperature. Articles entering the cooling channel after the production is started will be cooled more than desired.

Different embodiment of universal cooling channels are known from the German magazine "Suesswaren" 1/2-1988, pages 43–47. The cooling medium enters the cooling channel in the middle region in a way that at least two cooling stretches are formed. Depending on the relative directions of movement, the articles are cooled in an inverse movement or in the same direction. It is desired to cool the articles carefully in the entering region of the cooling channel to have a positive effect on the aftercrystallization in the chocolate mass. The temperature profile has its minimum approximately in the middle region of the cooling channel. The temperature increases a little bit in the direction toward the exit of the cooling channel to prevent humidity from condensing at the articles.

Certain physical requirements have to be met to successfully cool chocolate covers. It is necessary to provide a careful and gentle cooling effect in the region of the entrance of a cooling channel. The temperature of the cooling medium is comparatively great to exclusively stimulate the increase and the growth, respectively, of the stable Beta V-crystals that have been formed during the precrystalization of the chocolate. When this temperature of the cooling medium at the entrance of the cooling channel decreases due to a low heat load (due to a decreased flow of products and a partial load), the temperature difference between the warmer chocolate cover and the temperature of the cooling medium (air or water) is increased. This has the effect of undesired unstable Beta IV-crystals being formed.

The temperature of the surfaces of the articles exiting the cooling channel preferably is more than, for example, in the middle region of the cooling channel. This temperature preferably is constant, and it has a value such that the surface of the articles does not reach the dew point when the articles reach the packaging region after leaving the cooling channel.

When the dew point is reached humidity condenses on the surfaces of the articles. A small amount of humidity on the product cannot be seen, but it leads to the so-called sugar frost being solved from the chocolate by the humidity. As mentioned above, a low entering temperature results in undesired unstable Beta IV-crystals being formed in the cacao butter. Since cacao butter is polymorph, it may solidify in different forms of crystals (stable and unstable crystals). Only the stable crystals guarantee for a good and permanent gloss. Cacao butter also is monotropic. This means that different forms of crystals may convert independently. This is only true for low melting unstable crystals turning into higher melting stable crystals.

When unstable crystals are formed in the first part of a cooling channel due to a strong cooling effect, the crystals automatically convert into stable crystals after a few weeks. The conversion of the crystals in cacao butter in a chocolate product results in energy being set free, and in the undesired fat frost (gray haze) on the surface of the product.

In the above described cooling channels and similar cooling channels, it is desired to provide a certain temperature profile along the length of the cooling channel by the cooling medium in the at least two cooling stretches. The temperature is higher at the entrance and at the exit of the cooling channel than in the middle region in which it reaches its minimum. Consequently, the region of the entrance of the cooling channel is carefully cooled, the middle region is cooled more powerful, and the temperature of the articles is slightly increased in the region of the exit. In this way, it is ensured that the temperature of the surface of the articles at the exit of the cooling channel is not too low. It is prevented that humidity condenses on the articles. In case such humidity does condense, the durability of the articles being covered with chocolate is reduced, and the articles do not look as good as desired. The articles look dull and gray. After a number of articles have passed the cooling channel in case of a new start of the production and an adaptation to the constant load of the cooling channel has been attained, the cooling channel fulfils its desired function. This means that the articles are correctly cooled, and their surfaces have the desired gloss and firmness as it is necessary for packaging. When no articles enter the cooling channel and the production is stopped, the cooling medium does not absorb heat any more. Consequently, the cooling medium does not heat up either. This means that the final or end temperature of the cooling medium substantially corresponds to the beginning temperature of the cooling medium after a short period of time. The temperature is correspondingly low. When articles do enter the cooling channel afterwards, these articles are cooled to a great extent, and the above described disadvantages occur. The temperature of the cooling medium is too low. This is true at the entrance of the cooling channel as well as at the exit of the cooling channel.

SUMMARY OF THE INVENTION

Briefly described, the present invention provides an apparatus for cooling articles. The apparatus may be especially used with air as cooling medium for the upper cooling of the articles. The apparatus may also be applied with water as cooling medium for the bottom cooling of the articles.

The apparatus includes a cooling channel having an entrance, a middle region and an exit. A conveyer belt transports the articles from the entrance toward the exit through the cooling channel. The articles in the cooling channel are exposed to a temperature profile extending approximately from the entrance to the exit of the cooling channel. At least one first cooling medium flows through a first cooling circuit. A first cooling stretch is connected to the first cooling circuit, the first cooling medium entering the first cooling stretch in the middle region of the cooling channel at a first entering temperature. At least one first temperature sensor is arranged in the region of the entrance of the cooling channel to sense the temperature of the first cooling medium in the region of the entrance of the cooling channel. A first control device controls the temperature of the first cooling medium in the sense of keeping the temperature substantially constant in the region of the entrance of the cooling channel and in the sense of changing the first entering temperature of the first cooling medium in response to the load of articles being located in the cooling channel. At least one second cooling medium flows through a second cooling circuit. A second cooling stretch is connected to the second cooling circuit, the second cooling medium entering the second cooling stretch in the middle region of the cooling channel at a second entering temperature. At least one second temperature sensor is arranged in the region of the exit of the cooling channel to sense the temperature of the second cooling medium in the region of the exit of the cooling channel. A second control device controls the temperature of the second cooling medium in the sense of keeping the temperature substantially constant in the region of the exit of the cooling channel and in the sense of changing the second entering temperature of the second cooling medium in response to the load of articles being located in the cooling channel.

The present invention also relates to a method of cooling articles. The articles to be cooled are transported on a conveyer belt through a cooling channel including an entrance, a middle region and an exit. The articles enter the cooling channel through the entrance of the cooling channel, and they exit the cooling channel through the exit of the cooling channel. The articles are exposed to a temperature profile extending from the entrance to the exit of the cooling channel. At least one first cooling medium having a first entering temperature is entered into the middle region of the cooling channel to flow through a first cooling stretch of the cooling channel. The temperature of the first cooling medium in the region of the entrance of the cooling channel is determined. The amount and the flowing parameters of the first cooling medium are kept substantially constant. The temperature of the first cooling medium in the region of the entrance of the cooling channel is kept substantially constant. The first entering temperature of the first cooling medium is controlled in response to the load of articles in the cooling channel. At least one second cooling medium having a second entering temperature is entered into the middle region of the cooling channel to flow through a second cooling stretch of the cooling channel. The temperature of the second cooling medium in the region of the exit of the cooling channel is determined. The amount and the flowing parameters of the second cooling medium are kept substantially constant. The temperature of the second cooling medium in the region of the exit of the cooling channel is kept substantially constant. The second entering temperature of the second cooling medium is controlled in response to the load of articles in the cooling channel.

The invention is based on the concept not to sense and determine the entering temperature of the cooling medium in the middle region of the cooling channel and to keep it constant, but, instead to sense and determine the temperature of the cooling medium in the region of the entrance of the cooling channel. This is the region in which the articles enter the entrance of the cooling channel. Similar is true for the exit of the cooling channel. The temperature of the cooling medium is also sensed and kept constant at the exit of the cooling channel. This is the region in which the articles exit the cooling channel. The amount of the cooling medium is kept constant, and the streaming parameters of the cooling medium remain unchanged even in case of changing loads of articles being located in the cooling channel. Since the cooling channel preferably is designed in a way that the articles are uniformly treated temperaturewise along the width of the cooling channel transverse to the conveying direction, and there is no change of the stream in case of changing loads of the cooling channel, the articles are uniformly treated temperaturewise in a transverse direction with respect to the working direction even in case of partial loads. Since there has to be an adaptation in case of changing loads of the cooling channel, because the amount of heat to be dissipated changes, this is achieved by adapting the entering temperature of the cooling medium of each cooling stretch in the middle region of the cooling channel in response to the changing conditions. This means that, in case of a stop of the production during which no articles are transported through the cooling channel, the entering temperature of the cooling medium of each cooling stretch is increased up to the value of the constant temperature of the cooling medium in the region of the entrance of the cooling channel. Similar is true for the exit of the cooling channel. With the novel cooling channel and the novel method of cooling, a high quality product having full gloss, great durability and providing the possibility of immediately being packed is attained even for the first rows of products being transported through the cooling channel after a stop of the production. Rejects or articles of reduced quality are no longer produced.

An especially easy possibility of realizing the novel method is to use the temperatures of the cooling medium in the region of the entrance and in the region of the exit of the cooling channel as guiding values. The entering temperature of the cooling medium of each cooling stretch is changed by changing the power of each heat exchanger of each cooling stretch or by modulating the temperature in case of a liquid cooling medium being used. In this way, there is a constant temperature of the cooling medium at least in single cooling stretches of a cooling channel during times of no production. Since the temperature of the cooling medium does not have to be the same at the entrance and at the exit of the cooling channel, the separate cooling stretches may be operated at different temperatures. The temperature within one cooling stretch is constant. The temperatures of the cooling mediums of the corresponding cooling stretches can be changed quickly since in case of a new start of the production, the cooling channel is not instantly loaded with articles corresponding to a full load. The articles entering the cooling channel require the passing time of a row of articles through the cooling channel until the full load is realized. The entering temperature of the corresponding cooling medium is changed without any problems within this period of time. The present invention is not only applicable to a cooling channel including two cooling stretches. The present invention is also applicable to the first and to the last cooling stretch in case a cooling channel includes more than two cooling stretches. In this case, the exiting temperatures of the corresponding cooling medium of each cooling stretch are kept constant even in case of changing loads of the cooling channel with articles since there is not too much heat that has to be absorbed and transported through the return conduit of the cooling medium.

There is the possibility of the temperatures of the cooling medium being kept constant at different values at the region of the entrance and of the exit of the cooling channel. Usually, the temperature of the cooling medium in the region of the entrance of the cooling channel is more than it is in the region of the exit of the cooling channel. On the other hand, the temperature profile of the cooling medium and of the cooling mediums, respectively, has a minimum between the entrance and the exit of the cooling channel. There may be a discontinuity of the temperature in the middle region. The minimum is more characteristic in case of a full load of the cooling channel than during partial load.

It is essential to the present invention to arrange the temperature sensors for the control of the cooling channel at a different location than in the prior art. The temperature sensors are arranged in the region of the entrance and in the region of the exit of the cooling channel. Consequently, they are arranged at a place where the articles enter and exit, respectively, the cooling channel. The temperature is kept constant at these places, no matter whether or not articles are present in the cooling channel. Thus, the desired temperature of the cooling medium prevails in case of each new start and after each stop of the production, respectively. The desired temperature of the cooling medium already cools the first row of articles entering the cooling channel. Since the load of the cooling channel increases, meaning that more heat has to be absorbed, the entering temperature of the cooling medium of each cooling stretch in the middle region of the cooling channel is adapted to the changing conditions. This may happen until the cooling channel is operated under full load, again. In case of full load, there is the greatest temperature difference between the entering temperature of the cooling medium and the temperature of the cooling medium at the entrance of the cooling channel. Similar is true for the exit of the cooling channel.

The temperature sensors preferably are arranged at the entrance and at the exit of the cooling channel in the region through which the articles are transported. Thus, the temperature sensors are arranged at a location through which air streams. Changes of the temperature in response to changes of the entering temperature of the cooling medium are sensed quickly at this location. Consequently, the temperatures are controlled fast enough. This is true when there are no articles in the cooling channel, as well as when articles reenter the cooling channel. Since the temperature of the cooling medium is kept constant at the desired optimum value at the entrance of the articles into the cooling channel, the apparatus is ready to operate at all working conditions. It is ensured that all articles are correctly treated temperaturewise at least at this location no matter what the conditions are. The temperature of the air as cooling medium at the entrance of the articles into the cooling channel is not too cold any longer, as it is the case during a new start of the production in the prior art.

The temperature of the air as cooling medium is kept constant at the exit of the cooling channel. The exit of the cooling channel is the place where the articles leave the cooling channel. It is ensured that humidity does not condense on the articles after the articles have exited the cooling channel. The temperature sensors are either arranged in the stream of air of the upper cooling portion of the two cooling stretches and/or in the stream of the liquid cooling medium of the bottom cooling portion. The entering temperature of the air as cooling medium and the exiting temperature are free to be controlled and changed. In case of a full load of the cooling channel, these temperatures are decreased with respect to the temperatures of the cooling medium at the entrance and the exit of the cooling channel. During times of no production, the entering temperature and the exiting temperature of the cooling medium in the middle region of the cooling channel is increased such that the temperature profile is at least constant within each cooling stretch.

In case of air being the cooling medium in an upper cooling for the articles, it may be advantageous to separate the cooling stretch being arranged at the entrance of the cooling channel into two portions. The first portion ending at the entrance of the cooling channel is designed and arranged to provide a convection cooling in an inverse stream. The second portion beginning in the middle region may be designed and arranged to provide a radiation cooling. There is the advantage of the articles, especially the chocolate covering the articles, get in contact with air at the entrance of the cooling channel, the air being a plurality of degrees Celsius warmer than in the center or the middle of the cooling channel. Consequently, the temperature difference between the still warmer chocolate and the air as cooling medium in the region of the entrance of the articles is great enough to transmit the heat as desired. On the other hand, it is prevented that the articles are cooled too quickly in the entering region of the cooling channel. The undesired effects for the after crystalization of the tempered chocolate are also prevented. The temperature difference in the middle of the cooling channel is kept smaller in this way. It is desired that the temperature of the air at the exit of the cooling channel is slightly warmer than in the middle of the cooling channel. In this way, the temperature of the articles exiting the cooling channel is not too low. It is prevented that humidity condenses on the surface of the articles after the articles have exited the cooling channel. During normal production, the temperature profile of the air along the length of the cooling channel is automatically adjusted. The second cooling stretch being arranged in the region of the exit of the cooling channel is designed for convection cooling in the same flowing direction in case of air being the cooling medium for an upper cooling. Consequently, the first cooling stretch works in an inverse direction, and the second cooling stretch works in the same direction as the articles move. Such a combination makes sense to attain the comparatively more powerful cooling effect for the articles in the region of the first cooling stretch.

The first cooling stretch being allocated to the entrance of the cooling channel and the second cooling stretch being allocated to the exit of the cooling channel are designed and arranged for contact cooling in case of water being the cooling medium in a bottom cooling for the articles. It is to be understood that the cooling channel may include an upper cooling and a bottom cooling at the same time. The bottom cooling may be used in addition to the upper cooling.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
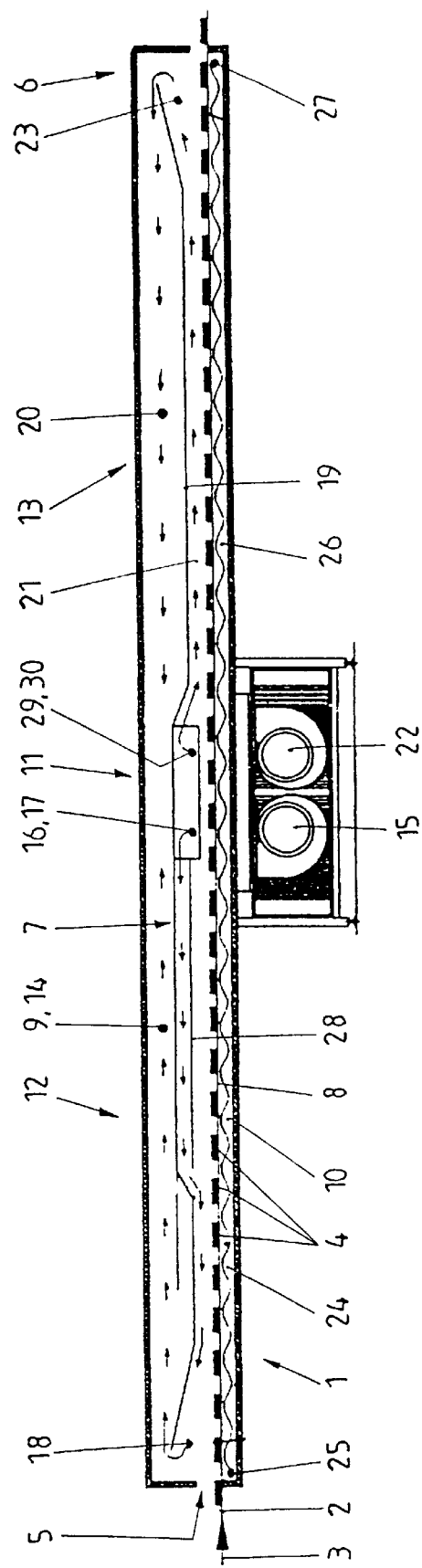
FIG. 1 is a longitudinal sectional view of a cooling channel including two cooling stretches.

Referring now in greater detail to the drawings, FIG. 1 illustrates a longitudinal sectional view of a cooling channel 1. The basic design of the cooling channel 1 is known. The cooling channel 1 is a longitudinal tunnel-like structure through which a conveyor belt 2 is moved according to arrow 3. Articles 4 are located on the conveyor belt 2. Usually, the articles 4 are supported on the conveyor belt 2 in transverse rows side by side along the width of the conveyor belt 2. The cooling channel 1 includes an entrance 5 and an exit 6. The articles 4 enter the cooling channel 1 at the entrance 5, and they are treated temperaturewise in the cooling channel 1, and they exit the cooling channel 1 at the exit 6 with the driven conveyor belt 2. The cooling channel 1 has an approximately rectangular cross section 7 being separated into an upper cross section portion 9 and a lower cross section portion 10 by a bottom plate 8 over which the conveyor belt 2 is moved. It is to be understood that a plurality of sections of bottom plates may be provided instead of one continuous bottom plate 8. The cooling channel 1 may consist of single components along its length, as this is generally known. An upper cooling is realized in the upper cross section portion 9. This means that the articles 4 are cooled from above in this section. A bottom cooling is arranged in the lower cross section portion 10. The bottom cooling serves to cool the bottom portions of the articles 4. In this embodiment, the upper cooling in the upper cross section portion 9 uses air as cooling medium. In this embodiment, the bottom cooling in the lower cross section portion 10 is realized by water as cooling medium.

A middle region 11 is located approximately at half the length of the cooling channel 1 between the entrance 5 and the exit 6. The middle region 11 may also be located closer to the entrance 5 or closer to the exit 6. In any case, the middle region 11 divides the length of the cooling channel 1 into two cooling stretches 12 and 13. It is also possible that the cooling channel 1 is divided into three or more cooling stretches. In all cases, there is a first cooling stretch 12 stating at the entrance 5 of the cooling channel 1. Additionally, there always is a last cooling stretch 13 ending at the exit 6. There may be one or more cooling stretches in the middle region 11.

In the exemplary embodiment as illustrated in FIG. 1, the first cooling stretch 12 extends from the entrance 5 of the cooling channel 1 to the middle region 11. Air 14 is used as cooling medium in the upper cross section portion 9. The air 14 enters the middle region 11 of the cooling channel 1 by a fan 15. A temperature sensor 16 is arranged in the middle region 11 or at the exit of the fan 15 to sense the entering temperature 17 of the air 14 in the region of the first cooling stretch 12. The upper cooling being realized in the region of the first cooling stretch 12 partially works with radiation, and partially with convection. As illustrated by a number of arrows, the air 14 of the upper cooling of the cooling stretch 12 first streams above a bottom 28 in the direction toward the entrance 5. In this second portion of the cooling stretch 12, the articles 4 are cooled due to radiation. Approximately in the region of half the length of the cooling stretch 12 or at a adjustable position along the length, the air 14 flows in a downward direction, and it reaches a region of the upper cross section portion 9 in which it directly contacts the articles 4. A temperature sensor 18 is arranged at the entrance 5 of the cooling channel 1. The temperature sensor 18 senses the temperature of the air 14 as cooling medium at the entrance 5. In this region, the streaming direction of the air 14 is inverted, and the air 14 flows back through the upper portion of the cross section portion 9 and to the middle region 11 of the cooling channel 1. The air 14 of the upper cooling in the region of the first cooling stretch 12 is substantially guided as a reverse direction flow with respect to the direction of movement of the conveyor belt 2 and of the articles 4, respectively, according to arrow 3.

A bottom 19 is arranged in the region of the second cooling stretch 13 extending from the middle region 11 to the exit 6 of the cooling channel 1. The bottom 19 separates the upper cross section portion 20 above the bottom plate 8. Air 21 is used as cooling medium in the cooling stretch 13 in the region of the upper cooling. The air 21 enters the middle region 11 of the cooling channel 1 by a fan 22, and it first streams in the same direction over the articles 4 according the arrows between the conveyor belt 2 and the bottom 19. In this case, convection is used to cool the articles 4. The air 21 enters in the middle region 11 of the cooling channel 1. A temperature sensor 29 may be arranged in this region to sense the entering temperature 30 of the air 21. A temperature sensor 23 is arranged at the exit 6 to sense the temperature of the air 21 at the exit 6 of the cooling channel 1. The streaming direction of the air 21 is inverted at the exit 6, and the air 21 streams back above the bottom 19 into the middle region 11.

Water is used as cooling medium in the region of the bottom cooling of the cooling channel 1. Water 24 streams into the middle region 11 of the cooling channel 1 in the region of the first cooling stretch 12, and it moves in the direction toward the entrance 5 of the cooling channel 1. A temperature sensor 25 is arranged in the region of the entrance 5 to sense the temperature of the water 24 at the entrance 5 of the cooling channel 1. The second cooling stretch 13 has a similar design in the region of the bottom cooling. Again, water 26 enters the middle region 11. The water 26 streams below the bottom plate 8 in the direction of the exit 6 of the cooling channel 1. A temperature sensor 27 is arranged at the exit 6 in the lower cross section portion 8 to sense the temperature of the water 26 at the exit 6 of the cooling channel 1.

Figure 2:
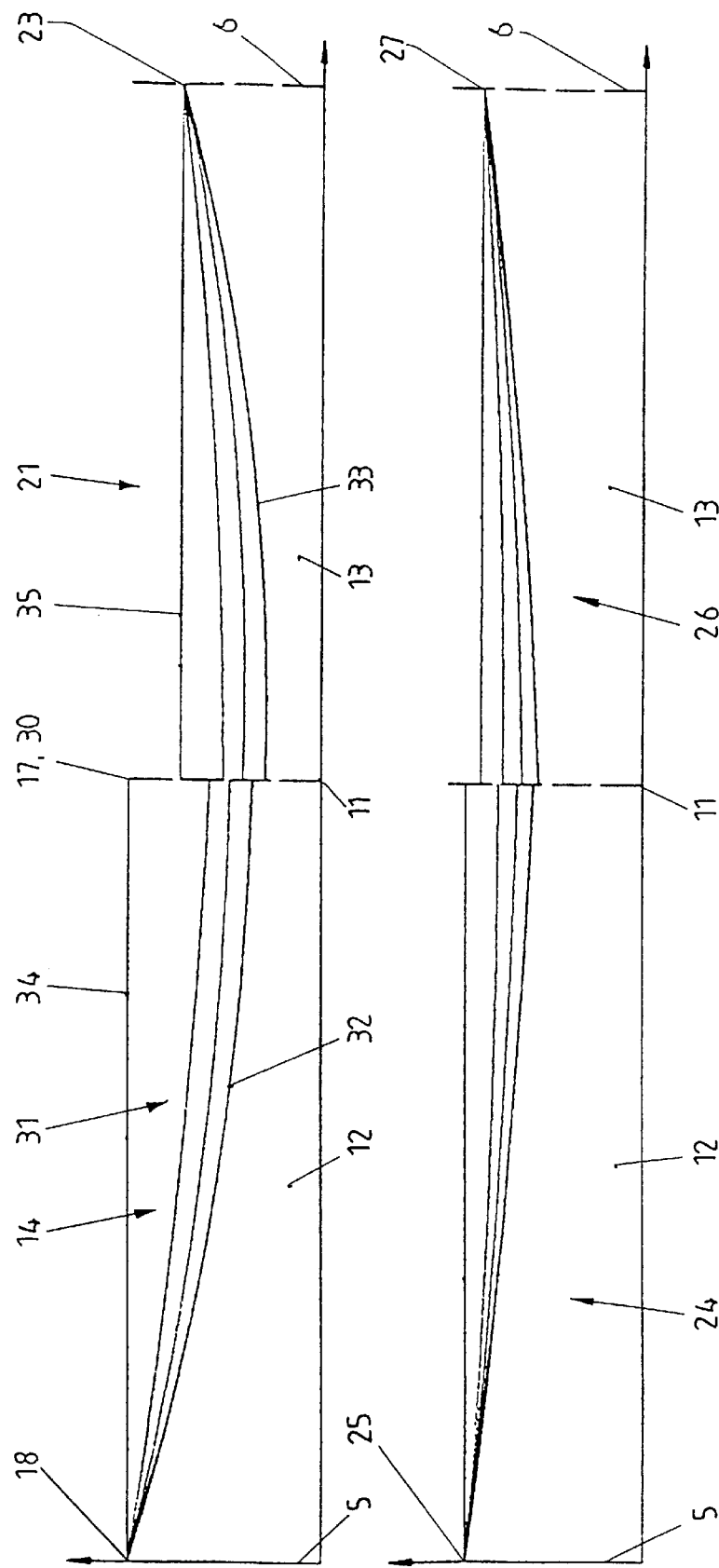
FIG. 2 is a view of the temperature profiles of the air and the liquid along the length of the cooling channel.

FIG. 2 depicts temperature profiles along the length of the cooling channel 1. The upper portion of FIG. 2 illustrates temperature profiles 31 of the air 14 in the region of the first cooling stretch 12, and of the air 21 in the region of the second cooling stretch 13. The temperature profiles 31 extend from the entrance 5 of the cooling channel 1 along the first cooling stretch 12 to the middle region 11, and further on along the second cooling stretch 13 to the exit 6 of the cooling channel 1. The lowermost line 32 in the region of the first cooling stretch 12 being continued by the lowermost line 33 in the region of the second cooling stretch 13 corresponds to the condition at full load of the cooling channel 1. This means that the number of articles 4 for which the cooling channel 1 has been designed are transported through the cooling channel 1 to be thermally treated. The uppermost line 34 in the region of the cooling stretch 12 being continued by the uppermost line 35 in the region of the cooling stretch 13 corresponds to a stop of the production. This means a condition in which no articles 4 are transported through the cooling channel 1. Other lines indicate a partial load. It can be seen from the upper portion of FIG. 2 that the temperature of the air 14 at the entrance 5 of the cooling channel 1 being sensed by the temperature sensor 18 is kept constant even in case of changing loads of the cooling channel 1. In the contrary, the entering temperature 17 of the air 14 in the middle region 11 is changed in response to the load of the cooling channel 1. In case of a stop of the production, meaning that no articles 4 are located in the cooling channel 1, the entering temperature 17 of the air 14 is increased up to the value of the temperature of the air at the entrance 5 of the cooling channel 1 being measured by the temperature sensor 18. Similar is true with respect to the exit 6 of the cooling channel 1 and the second cooling stretch 13. Again, the lowermost line 33 corresponds to a full load of the cooling channel 1. The entering temperature 30 of the air 21 in the middle region 11 is increased up to the value of the temperature at the exit 6 when there is no production. The temperature profile 31 with its values of temperatures is kept constant in the region of the entrance 5 and of the exit 6, whereas a minimum is achieved in case of a full load. When the production is stopped, there is a stepped temperature profile according to lines 34 and 35.

Similar is true for the bottom cooling being illustrated in the lower portion of FIG. 2. The temperature of the water 24 and 26, respectively, is illustrated from the entrance 5 to the middle region 11 and to the exit 6 of the cooling channel 1. Again, the lowermost line indicates full load. Lines being arranged above correspond to partial load and to times during which there is no production and the production is stopped, respectively, and during which the conveyor belt 2 moves through the cooling channel 1, but no articles 4 are located on the conveyor belt 2. The temperature of the water 24 at the entrance 5 of the cooling channel 1 is kept constant during all working conditions. This is also true for the temperature of the cooling water 26 at the exit 6 of the cooling channel 1 and at the temperature sensor 27, respectively.

Figure 3:
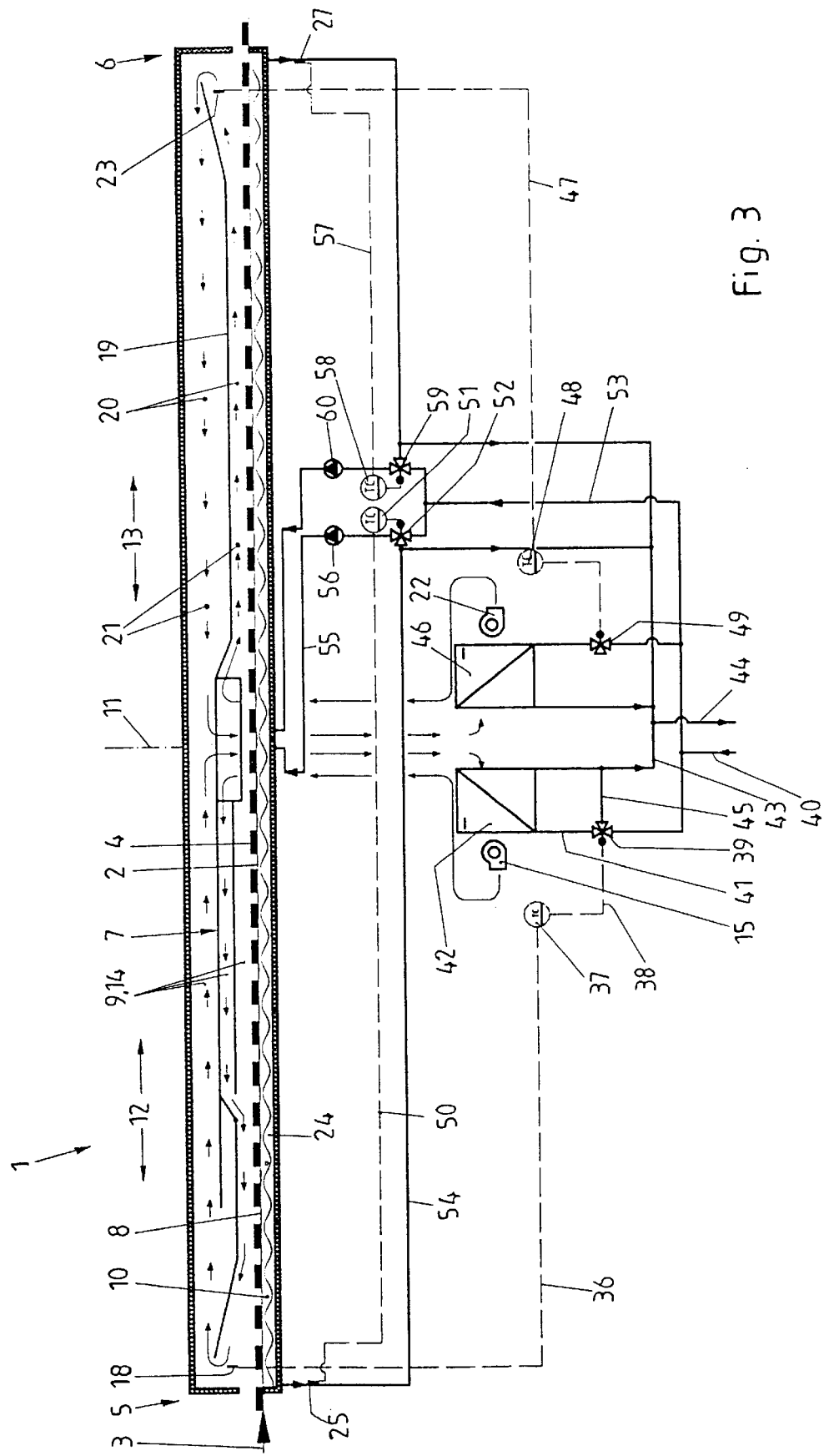
FIG. 3 is a diagram illustrating essential elements of the cooling channel.

FIG. 3 makes it clear that the temperature sensors 16 and 29 for sensing the entering temperatures 17 and 13 are not necessarily required. It is essential that there is the temperature sensor 18 at the entrance 5 of the cooling channel 1 and the temperature sensor 23 at the exit of the cooling channel 1, at least as far as the upper cooling is concerned. The temperature sensor 18 is connected to a temperature control device 37 by an electric line 36. The temperature control device 37 actuates a modulating two-way valve 39 via a line 38. Cold water, for example from a network, is introduced by a conduit 40, and it reaches a heat exchanger 42 via the two-way valve 39 and a conduit 41. A conduit 43 leads from the heat exchanger 42 to a return conduit 44. A connecting conduit 45 leads from the conduit 43 to the two-way valve 39 such that it is possible to partially circulate the water, and to change its temperature by adding cold water from the conduit 40. The temperature of the air at the entrance 5 of the cooling channel 1 being sensed by the temperature sensor 18 is the reference variable to be kept constant. The temperature of the cooling water in the heat exchanger 42 is changed in response to the load. The fan 15 sucks in air from the atmosphere or from a circuit, and it transports the air having the correspondingly changed entering temperature 17 into the cooling channel 1. The cooling air enters into the middle region 11, and it moves along the first cooling stretch 12, first to the entrance 5 of the cooling channel 1 with a reverse movement, and then back to the middle region 11. As indicated by the arrows, at least a portion of the cooling air may circulate.

Similar is true for the upper cooling of the cooling stretch 13. The fan 22 transports the air 21 in a circuit. The air 21 moves through a heat exchanger 46 being connected to the conduit 40 for cold water. It is also possible that the conduit 40 is a conduit of a refrigerating apparatus. The temperature sensor 23 at the exit 6 of the cooling channel 1 is connected to a temperature control device 48 by an electric line 47. The temperature control device 48 controls a two-way valve 49. The temperature of the heat exchanger 46 is changed and adapted to the load, respectively, by the modulating two-way valve 49. Correspondingly, the entering temperature 30 of the air 21 at the secondary side is changed, as this has been described above with reference to FIG. 2.

FIG. 3 also illustrates the region of a simultaneous bottom cooling. The temperature sensor 25 in the region of the entrance 5 of the cooling channel 1 senses the temperature of the water 24 at the entrance 5. An electric line 50 realizes the connection to a temperature control device 51 controlling a two-way valve 52. Cold water enters the two-way valve 52 by a conduit 53 being connected to a conduit 40. The water 24 circulates in the region of the first cooling stretch 12 via a conduit 54, and it reaches the two-way valve 52. A conduit 55 in which a pump 56 is arranged leads from the two-way valve 52 to the middle region 11 of the cooling channel 1. The temperature of the water 24 at the entrance 5 of the cooling channel 1 being sensed by the temperature sensor 25 is kept constant. The entering temperature of the water 24 in the middle region 11 is changed in response to the load of the cooling channel 1, as this is illustrated in the lower portion of FIG. 2.

The bottom cooling in the region of the second cooling stretch 13 is designed correspondingly. The temperature sensor 27 is connected to a temperature control device 58 via an electric line 57. The temperature control device 58 controls a two-way valve 59. A pump 60 serves to continuously move the cooling medium in the region of the bottom cooling of the cooling stretch 13. The entire cooling medium is continuously moved, no matter in which circuit it is located, also during times of no production. In this way, it is possible to keep the temperature of the cooling medium at the entrance 5 and at the exit 6 constant, and to vary the temperature only in the middle region 11 corresponding to the changing loads of the cooling channel 1. Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for cooling articles, comprising:
   a cooling channel having an entrance, a middle region and an exit;
   a conveyer belt for transporting the articles from the entrance toward the exit through said cooling channel, the articles in said cooling channel being exposed to a temperature profile extending approximately from the entrance to the exit of said cooling channel;
   a first cooling circuit through which at least one first cooling medium flows;
   a first cooling stretch being connected to said first cooling circuit, the first cooling medium entering said first cooling stretch in the middle region of said cooling channel at a first entering temperature;
   at least one first temperature sensor being arranged in the region of the entrance of said cooling channel for sensing the temperature of the first cooling medium in the region of the entrance of said cooling channel;
   a first control device for controlling the temperature of the first cooling medium in the sense of keeping the temperature substantially constant in the region of the entrance of said cooling channel and in the sense of changing the first entering temperature of the first cooling medium in response to the load of articles being located in said cooling channel;
   a second cooling circuit through which at least one second cooling medium flows;
   a second cooling stretch being connected to said second cooling circuit, the second cooling medium entering said second cooling stretch in the middle region of said cooling channel at a second entering temperature;
   at least one second temperature sensor being arranged in the region of the exit of said cooling channel for sensing the temperature of the second cooling medium in the region of the exit of said cooling channel; and
   a second control device for controlling the temperature of the second cooling medium in the sense of keeping the temperature substantially constant in the region of the exit of said cooling channel and in the sense of changing the second entering temperature of the second cooling medium in response to the load of articles being located in said cooling channel.

2. The apparatus of claim 1, wherein said first and second temperature sensors are arranged directly in the region of said cooling channel through which the articles are transported.

3. The apparatus of claim 1, wherein said first and second cooling stretch each includes an upper cooling and a bottom cooling.

4. The apparatus of claim 3, wherein the first and second cooling medium of the upper cooling is air, and wherein the first and second cooling medium of the bottom cooling is liquid.

5. The apparatus of claim 4, wherein said first and second temperature sensors are arranged in the stream of air of the upper cooling of said first and second cooling stretches.

6. The apparatus of claim 4, wherein said first and second temperature sensors are arranged in the stream of liquid of the bottom cooling of said first and second cooling stretches.

7. The apparatus of claim 4, wherein two first temperature sensors are arranged in the region of the entrance of said cooling channel, one of said two first temperature sensors being arranged in the stream of air of the upper cooling of said first and second cooling stretches, and the other one of said two first temperature sensors being arranged in the stream of liquid of the bottom cooling of said first and second cooling stretches; and two second temperature sensors are arranged in the region of the exit of said cooling channel, one of said two second temperature sensors being arranged in the stream of air of the upper cooling of said first and second cooling stretches, and the other one of said two second temperature sensors being arranged in the stream of liquid of the bottom cooling of said first and second cooling stretches.

8. The apparatus of claim 1, wherein said first and second cooling stretch each includes an upper cooling;

the first and second cooling medium of the upper cooling is air; and said first cooling stretch includes two separate sections, the first section ending at the entrance of said cooling channel and being designed and arranged to cool the articles due to convection in a an inverse flow direction with respect to the movement of the articles, and the second section beginning in the middle region of said cooling channel and being designed and arranged to cool the articles due to radiation.

9. The apparatus of claim 1, wherein said first and second cooling stretch each includes an upper cooling;

the first and second cooling medium of the upper cooling is air; and said second cooling stretch is designed and arranged to cool the articles due to convection in a an inverse flow direction with respect to the movement of the articles.

10. The apparatus of claim 1, wherein said first and second cooling stretch each includes a bottom cooling;

the first and second cooling medium of the bottom cooling is liquid; and said first and second cooling stretches are designed and arranged to cool the articles due to contact.

11. The apparatus of claim 1, wherein the articles to be cooled are sweets being covered with a chocolate mass.

12. An apparatus for cooling articles being covered with a chocolate mass, comprising:

a cooling channel having an entrance, a middle region and an exit;

a conveyer belt for transporting the articles from the entrance through the middle region and toward the exit of said cooling channel, the articles in said cooling channel being exposed to a temperature profile extending approximately from the entrance to the exit of said cooling channel;

a first cooling circuit through which air flows;

a first cooling stretch being connected to said first cooling circuit, the air entering said first cooling stretch in the middle region of said cooling channel at a first entering temperature to flow through an upper cooling of said cooling channel;

a first temperature sensor being arranged in the region of the entrance of said cooling channel for sensing the temperature of the air in the region of the entrance of said cooling channel;

a first control device for controlling the temperature of the air in the sense of keeping the temperature substantially constant in the region of the entrance of said cooling channel and in the sense of changing the first entering temperature of the air in response to the load of articles being located in said cooling channel;

a second cooling circuit through which air flows;

a second cooling stretch being connected to said second cooling circuit, the air entering said second cooling stretch in the middle region of said cooling channel at a second entering temperature to flow through the upper cooling of said cooling channel;

a second temperature sensor being arranged in the region of the exit of said cooling channel for sensing the temperature of the air in the region of the exit of said cooling channel;

a second control device for controlling the temperature of the air in the sense of keeping the temperature substantially constant in the region of the exit of said cooling channel and in the sense of changing the second entering temperature of the air in response to the load of articles being located in said cooling channel;

a third cooling circuit through which liquid flows and being connected to said first cooling stretch, the liquid entering said first cooling stretch in the middle region of said cooling channel at a third entering temperature to flow through a bottom cooling of said cooling channel;

a third temperature sensor being arranged in the region of the entrance of said cooling channel for sensing the temperature of the liquid in the region of the entrance of said cooling channel;

a third control device for controlling the temperature of the liquid in the sense of keeping the temperature substantially constant in the region of the entrance of said cooling channel and in the sense of changing the third entering temperature of the liquid in response to the load of articles being located in said cooling channel;

a fourth cooling circuit through which liquid flows and being connected to said second cooling stretch, the liquid entering said second cooling stretch in the middle region of said cooling channel at a fourth entering temperature to flow through the bottom cooling of said cooling channel;

a fourth temperature sensor being arranged in the region of the exit of said cooling channel for sensing the temperature of the liquid in the region of the exit of said cooling channel;

a fourth control device for controlling the temperature of the liquid in the sense of keeping the temperature substantially constant in the region of the exit of said cooling channel and in the sense of changing the fourth entering temperature of the liquid in response to the load of articles being located in said cooling channel.

13. The method of claim 12, wherein the articles to be cooled are sweets being covered with a chocolate mass.

14. A method of cooling articles, comprising the steps of:

transporting the articles to be cooled on a conveyer belt through a cooling channel including an entrance, a middle region and an exit, the articles entering the cooling channel through the entrance of the cooling channel and exiting the cooling channel through the exit of the cooling channel, the articles being exposed to a temperature profile extending from the entrance to the exit of the cooling channel;

entering at least one first cooling medium having a first entering temperature into the middle region of the cooling channel to flow through a first cooling stretch of the cooling channel;

determining the temperature of the first cooling medium in the region of the entrance of the cooling channel;

keeping the amount and the flowing parameters of the first cooling medium substantially constant;

keeping the temperature of the first cooling medium in the region of the entrance of the cooling channel substantially constant;

controlling the first entering temperature of the first cooling medium in response to the load of articles in the cooling channel;

entering at least one second cooling medium having a second entering temperature into the middle region of the cooling channel to flow through a second cooling stretch of the cooling channel;

determining the temperature of the second cooling medium in the region of the exit of the cooling channel;

keeping the amount and the flowing parameters of the second cooling medium substantially constant;

keeping the temperature of the second cooling medium in the region of the exit of the cooling channel substantially constant; and controlling the second entering temperature of the second cooling medium in response to the load of articles in the cooling channel.

15. The method of claim 14, wherein one first cooling medium enters the middle region of the cooling channel to flow through an upper cooling of the cooling channel, the first cooling medium being air;

the other first cooling medium enters the middle region of the cooling channel to flow through a bottom cooling of the cooling channel, the first cooling medium being liquid;

one second cooling medium enters the middle region of the cooling channel to flow through the upper cooling of the cooling channel, the second cooling medium being air; and the other second cooling medium enters the middle region of the cooling channel to flow through the bottom cooling of the cooling channel, the second cooling medium being liquid.

16. The method of claim 15, wherein the first entering temperature of the first cooling medium flowing through the upper cooling of the cooling channel is changed by modulating the temperature of the liquid first cooling medium; and the second entering temperature of the second cooling medium flowing through the upper cooling of the cooling channel is changed by modulating the temperature of the liquid second cooling medium.

17. The method of claim 14, wherein the first entering temperature of the first cooling medium is changed depending on the temperature of the first cooling medium in the region of the entrance of the cooling channel; and the second entering temperature of the second cooling medium is changed depending on the temperature of the second cooling medium in the region of the exit of the cooling channel.

18. The method of claim 14, wherein the first entering temperature of the first cooling medium is changed by changing the power of a first heat exchanger of the first cooling stretch; and the second entering temperature of the second cooling medium is changed by changing the power of a second heat exchanger of the second cooling stretch.

19. The method of claim 14, wherein the at least one first cooling medium exits the first cooling stretch at at least one first exiting temperature, the first exiting temperature being kept constant even in case of changing loads of articles in the cooling channel; and the at least one second cooling medium exits the second cooling stretch at at least one second exiting temperature, the second exiting temperature being kept constant even in case of changing loads of articles in the cooling channel.

20. The method of claim 14, wherein the temperature of the at least one first cooling medium in the region of the entrance of the cooling channel differs from the temperature of the at least one second cooling medium in the region of the exit of the cooling channel.

* * * * *